June 26, 1962 G. L. REYMANN ETAL 3,040,781
SOLDERABLE COATING
Filed April 15, 1958
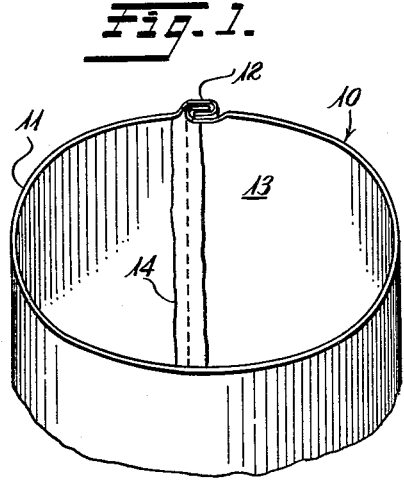
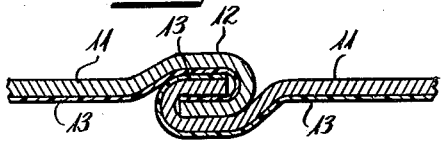
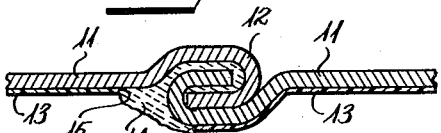
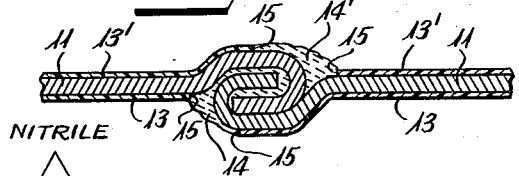
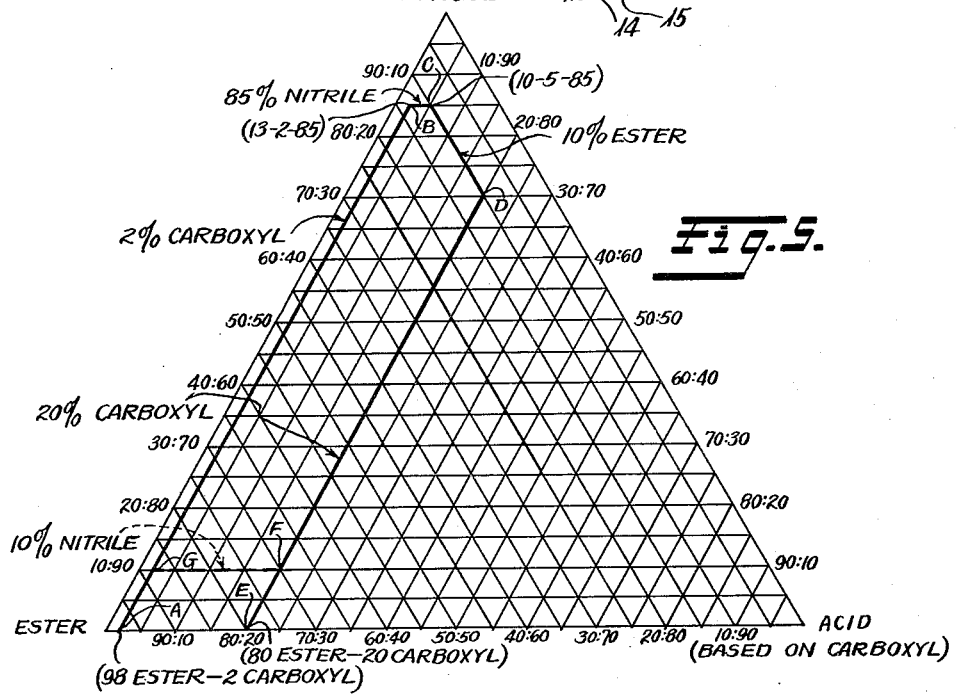
TRIANGULATION OF ESTER-ACID-NITRILE
COPOLYMER COMPONENTS IN MOL PER CENT
INVENTORS
George L. Reymann
BY Henry J. Bach
Schneider, Dressler, Goldsmith & Clement
ATTORNEYS

United States Patent Office 3,040,781
Patented June 26, 1962

3,040,781
SOLDERABLE COATING
George L. Reymann, Sewickley, and Henry J. Bach, Mount Lebanon Township, Allegheny County, Pa., assignors, by mesne assignments, to Martin-Marietta Corporation, Chicago, Ill., a corporation of Maryland
Filed Apr. 15, 1958, Ser. No. 728,594
8 Claims. (Cl. 138—145)

The present invention relates to the art of resinous coatings for containers for foods and beverages and closures therefor, in particular containers and closures made of sheet steel, which may be in the form of black plate or tin plate.

The invention more particularly relates to the provision of protective coatings for the lining of metal containers to serve as priming and/or as finish coatings for the metal and which simplify and assist the production of the containers by permitting the container to be soldered despite the presence of the coating and by strengthening the soldered seam.

Resinous sanitary coatings are generally employed for successful packaging of foods and beverages in containers for the reason that under present practice, the tin coatings have been reduced to a very minimum of thickness and protection of the underlying metal base from the food is required to forestall chemical attack. At increasing thinness of tin plate or other plate on the metal surface on the interior or exterior of the container or closure for foods, the tendency for pin holes to develop to the underlying steel base is augmented. The security afforded by coatings which can easily be applied from common organic solvent solution containing a substantial proportion of dissolved resin solids and possessing suitable coating viscosity and good flow properties has prompted the early adoption of inert thermally stable resinous coatings to improve the storage life of the packaged food despite the rough handling to which the metal cans may be subjected.

The requirements of such resinous coatings are very severe. These requirements include adhesion, the flexibility necessary to maintain adhesion during and after fabrication of the coated plate, e.g., into can ends and screw caps, and the inertness necessary to avoid imparting any undesirable flavor or toxic ingredient to the food or beverage contents of the container and to avoid any substantial impairment of the resinous film by the action of the container contents or water or steam at the elevated temperatures encountered in processing and/or pasteurizing the containers and their contents.

Heretofore, vinyl chloride and vinylidene chloride polymers and copolymers have been employed, particularly the copolymers, in order to achieve the toughness of coating and chemical resistance which is necessary while at the same time providing sufficient solubility for appropriate application of the coating material to the base. However, the vinyl chloride polymers and copolymers as well as the vinylidene chloride polymers and copolymers are susceptible to degradation by heat and are rather sensitive to iron which is present in the containers. This has severely limited their use.

In the production of metal containers, the protective coatings are applied to the metal surfaces in the form of a flat sheet and the coatings are dried by baking. The coated flat sheet is then severed or "slit" to form can body or can end blanks and these blanks are then fabricated to form can bodies and ends.

With many types of cans it is the general practice to solder the side seam of the can body to provide an air tight, leakproof or pressure resistant container.

In applying protective coatings to the flat metal sheets it is a general practice to leave a one-quarter to one-sixteenth inch wide non-coated margin for each can body blank on both surfaces of the metal. In the trade this is referred to as the "solder margin." Its function is to provide, when the can body is formed, a non-coated metal surface at the side seam of the container which can be properly soldered. With present day protective coatings, if the solder margins are coated an adequate solder weld is not obtained. In certain instances the failure of present day protective coatings is attributable primarily to failure of the coating adjacent the weld. Thus, oleoresinous coating lose film continuity adjacent the soldered area as a result of thermal decomposition evidenced by burning of the film adjacent the solder.

The coating of only a portion of the can body blank leads to expense and difficulty. Aside from the care and equipment required to produce the blank, the soldered can contains an uncoated area adjacent the soldered seam. This uncoated area must be protected and the practice has been to apply to the uncoated seam, after soldering, a side seam stripe lacquer to cover the exposed metal surface. This is an added and expensive operation requiring special lacquers.

There is within the can making industry a considerable need for a solderable protective can coating capable of being applied to the entire surface of the can body blank without having the coating interfere with the production of an adequate solder weld. In this way the need for a solder margin and the application of a seam stripe lacquer can be eliminated. At the present time, suitable can coating compositions are not solderable and those coating compositions which are known to permit soldering are poorly adapted to utilization as a protective coating for a container body. There is also a need to improve the seam strength of the solder seam which is formed even in the absence of an interfering coating in order to provide more strongly secured and hence more reliable metal containers.

It has now been discovered that certain acrylate and methacrylate copolymers which are entirely suitable for the protective coating of metal containers have the property of not only permitting the production of a solder seam despite the presence of the copolymer, but in addition, actually provide a substantial improvement in the strength of the soldered seam.

While there is no intention of being bound by any particular theory as to mechanism, it is thought that at the soldering temperatures (about 650–750° F.) that the copolymer in contact with the solder thermally depolymerizes and that the degradation products function as a flux for the solder to cause a uniform and dense solder seam to be formed. It appears that the presence of carboxylic acid in the copolymer and hence in the depolymerization products reacts chemically and physically with the metal base to enhance the adhesion of solder thereto, possibly through some fluxing action, while assuring a tight joint between the solder and the abutting copolymer film.

The acrylate and methacrylate copolymers of the invention are copolymerization products of an alkyl ester of an acid selected from the group consisting of acrylic acid, methacrylic acid and mixtures thereof with an alpha-beta monoethylenically unsaturated carboxylic acid or anhydride. Acrylonitrile is desirably included in the copolymerization product. Allyl glycidyl ether in an amount up to about 5% by weight may also be included in the copolymerization product.

More particularly, the invention includes the use of dipolymers of the acrylate or methacrylate esters with acid component as well as tripolymers containing both acrylate and methacrylate groups with the acid component. The invention also includes tripolymers of the acrylate or methacrylate esters with acid component together with acrylonitrile as well as the corresponding tetrapolymers in which both acrylate and methacrylate groups are present.

These dipolymers, tripolymers and tetrapolymers are all referred to hereinafter as copolymers which are defined as the product obtained when two or more copolymerizable compounds are polymerized together to yield a resinous material in which the starting compounds are chemically combined with one another.

These copolymers are generally formed by copolymerization in solvent solution, although this is not absolutely essential. The copolymers are normally applied as a film to the metal surface to be coated from a solvent solution containing the copolymer and the film is dried by baking. Preferred copolymers have a relative viscosity measured at 25° C. in a 1 gm./100 ml. solvent solution in dimethyl formamide of less than about 5.0 and preferably less than about 3.5. The relative viscosity should be above about 1.25, preferably above about 1.8 (1.4 when acrylonitrile is absent), since lower molecular weight copolymers possess inferior physical properties particularly in respect to blush resistance and film integrity. These lower molecular weight coplymer films are brittle and not sufficiently cohesive.

Relative viscosity is determined in an Ostwald-Fenske viscosimeter and is computed as follows:

$$\text{Relative viscosity} = \frac{\text{Solution efflux time}}{\text{Solvent efflux time}}$$

The relative viscosity is thus obtained by direct measurement. Specific viscosity may be derived by subtracting 1.0 from the relative viscosity.

There may be incorporated in the copolymer solution a proportion of a polyepoxide resin to further improve the can coating characteristics of the copolymer. It is desired to point out that some of the copolymers above referred to are thermoplastic while others are thermosetting. The polyepoxide serves as a cross-linking agent and reduces the curing temperature of the coating and/or increases the temperature resistance of the baked film, depending upon the particular copolymer with which it is blended.

The copolymer solutions, with or without the polyepoxide, can be blended with other synthetic resins such as "B" stage phenolic resins and vinyl chloride resins. The simultaneous incorporation of both the polyepoxide and the "B" stage phenolic resin constitutes a particularly preferred combination.

Suitable acrylic and methacrylic esters are alkyl esters. Particularly preferred acrylic esters contain from 1–10 carbon atoms in the alkyl group. Particularly preferred methacrylic esters contain from 2–18 carbon atoms in the alkyl group.

Illustrative acrylic esters which may be used are methyl, ethyl, butyl, isooctyl and decyl acrylates. Illustrative methacrylic esters are ethyl, butyl, hexyl, decyl and stearyl methacrylates.

Many alpha-beta mono-ethylenically unsaturated carboxylic acids or anhydrides may be used. Preferred acids are acrylic acid and methacrylic acid. However, there are many other suitable acids and anhydrides among which are itaconic acid, maleic acid, fumaric acid, crotonic acid, cinnamic acid, maleic anhydride, and itaconic anhydride.

Preferred unsaturated carboxylic acids in accordance with the invention have an unsubstituted terminal methylene group and have the formula:

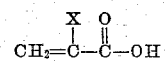

in which X is selected from the group consisting of hydrogen, lower alkyl and carboxylates having the formula:

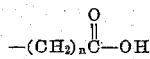

in which $n$ is an integer from 0–4. Thus the lower alkyl carboxylates are methyl, ethyl, propyl or butyl.

Proportions of the various monomeric components of the coplymers are important to the achievement of satisfactory can coating characteristics together with the ability to facilitate and assist the soldering operation.

For acrylate or methacrylate dipolymers with the acid component, the following proportions should be employed:

Ester _____ 80–98 mol percent.
Acid _____ 2–20 mol percent carboxyl.

For acrylate or methacrylate tripolymers with acrylonitrile and the acid component, the following proportions should be employed:

Ester _____ 10–83 mol percent.
Nitrile _____ 10–85 mol percent.
Acid _____ 2–20 mol percent carboxyl.

The operative proportions are graphically presented in the triangulation of FIG. 5 of the accompanying drawing in which the various copolymers which may be employed fall within the closed area A—B—C—D—E—A. When acrylonitrile is present, it is preferred to use at least 15 mol percent thereof in the copolymer and preferred acrylonitrile-containing copolymers fall within the enclosed area G—B—C—D—F—G.

When the ester component is constituted by a mixture of acrylic and methacrylic esters, it is preferred that the mol proportion of acrylic to methacrylic ester be from 1:3 to 2:1.

The monomeric reactants are dissolved in an organic solvent which is inert with respect thereto such as methyl ethyl ketone and a peroxide catalyst is incorporated in the solvent, generally in an amount of about 1%–2% by weight based on the weight of the monomers. The solution is then heated and maintained at an elevated temperature while the reactants combine to form a thermoplastic polymer. The reaction is most conveniently carried out by maintaining the solution at a reflux temperature for several hours, e.g., 5–15 hours.

The copolymer of the invention is preferably produced with the aid of a free radical polymerization catalyst in order to reduce the reaction time, but a catalyst is not essential to the reaction. Azodi-isobutyronitrile and benzoyl peroxide are two examples of useful catalysts for the purpose, in proportions by weight of 0.5% to 5% of the combined weight of the monomer components. Other catalysts may be selected from known vinyl polymerizing catalysts, such as organic oxidizing agents which contain the peroxide linkage 0–0, and azo compounds.

The temperature and pressure conditions for making the copolymers of the invention are not precisely limited, but for practical purposes are in the range of 20° C. to 150° C. at atmospheric pressure. The time for making the copolymers of the invention can vary from a few minutes to several days, depending on the temperature and pressure, the yield sought and the catalyst used, if any.

The copolymers of the invention are preferably produced with the aid of a suitable solvent to lower the viscosity of the components as they polymerize and to obtain a good reaction producing a high yield of a uniform copolymer, but the solvent is not essential to the reaction. Any solvent may be selected which is a good common solvent for the reactants in their original state, and for the completed copolymer, and which does not prevent or enter into the copolymer-producing reaction. Examples of such solvents are the following including mixtures thereof: aromatic hydrocarbon solvents such as benzene, toluene and xylene, ethyl benzene, isopropyl benzene and commercial mixed aromatic hydrocarbon solvents (mixed with more active solvents when using lower molecular weight acrylic and/or methacrylic esters); ether alcohols, such as ethylene glycol monobutyl ether, ethylene glycol monoethyl ether, diethylene glycol monobutyl ether, diethylene glycol monomethyl ether, and diethylene glycol monoethyl ether; ketones, such as methyl ethyl ketone and methyl isobutyl ketone; and such solvents as cyclohexanone, diacetone alcohol, acetone, dimethyl formamide, ethyl acetate and butyl propionate.

Solvents suitable for use with the copolymers of the invention to make coating compositions are any of those mentioned in the preceding paragraph, and others selected from those suitable for vinyl copolymers in general, e.g., isophorone. It has been found that an important advantage of the use of higher molecular weight acrylic type esters as acrylate type component lies in the fact that they permit the use of substantially larger proportions of aromatic hydrocarbon solvents in the solvent for purposes of forming coating compositions with desired qualities of viscosity and flow-out at given solids concentrations, than in the case when lower molecular weight acrylic type esters are used for this component. For example, the highest concentration of any aromatic hydrocarbon solvent with cyclohexanone for dissolving copolymers of ethyl acrylate is about 50%, whereas 100% aromatic solvent may be used as the solvent with isooctyl acrylate as the acrylate component. When thinned to the necessary degree with solvents such as those mentioned, the polymers of the invention may be applied by brushing, roller coating, spraying and other conventional means.

The polyepoxide may then be added to the copolymer solution together with a basic curing agent, e.g., an amine. The polyepoxide is employed in an amount of at least about 0.2 mol of oxirane group in the polyepoxide per mol of carboxylic group in the copolymer. An excess quantity of polyepoxide may be used but it is preferred to employ not more than 25 parts of the polyepoxide per 100 parts of the final resinous product.

The polyepoxide may be any aromatic or cycloaliphatic epoxide having at least one terminal epoxy group and a 1.2 epoxy equivalency greater than 1.0 and preferably in excess of 1.4 and of sufficiently high molecular weight to be of low volatility during the baking operation.

The average molecular weight of the polyepoxide should be at least about 300, and it is desirably higher to provide minimum volatility and resistance to leaching in the cured film containing the same. For aromatic polyepoxides the preferred compositions desirably have a molecular weight in excess of about 600 to be particularly resistant to leaching when contact with foods and beverages is intended.

The boiling point of polyepoxides of comparable molecular weight varies with the structure of the backbone of the polyepoxide molecule. As previously pointed out, the improved resistance to fabrication which may take place either before or after subjection of the coated product to pasteurizing or processing conditions requires that the polyepoxide boil above about 300° C. at normal atmospheric pressure.

The simplest of the polyether epoxides are the diglycidyl diethers of dihydric phenols, such as p,p'dihydroxy diphenyl 2-2'propane (bisphenol A), or polyhydric alcohols, such as glycerine or pentaerythritol. The diglycidyl diethers of dihydric phenols have glycidyl radicals linked to the automatic hydrocarbon radical by ethereal oxygen atoms.

More preferably, the polyether is of resinous character and contains at least one aromatic hydrocarbon radical which is connected to a glycidyl group through an ether oxygen linkage, there being preferably provided a total of two such glycidyl groups each having a terminal oxirane group and a plurality of recurring aromatic groups interlinked through ether oxygens to an intervening aliphatic radical which may contain secondary hydroxyl groups as the sole reactive group and which may, if desired contain internal ether groups.

As is known, the polyether is a complex mixture of compounds rather than being a single particular compound.

Any of the various dihydric phenols, or a mixture thereof, may be used in preparing the polyethers, including mono-nuclear phenols such as resorcinol, catechol, hydroquinone, methyl resorcinol, etc.; or polynuclear phenols like p,p'dihydroxy diphenyl 2-2'propane (bisphenol A), 4,4'-dihydroxybenzophenone, bis(4-hydroxyphenyl)methane, 1,1'-bis(4-hydroxyphenyl)ethane, 1,1'-bis(4-hydroxyphenyl)isobutane, 2,2'-bis(3-hydroxyphenyl)butane, 2,2' - bis(4-hydroxy-2-methylphenyl)propane, 2,2'-bis(2-hydroxynaphthyl)pentane, 1,5-dihydroxy-naphthalene, etc. The preferred phenol is p,p'dihydroxy diphenyl 2-2'propane.

The polyethers are prepared, in general, by heating at about 30° C. to 200° C. one or a mixture of dihydric phenols with epichlorohydrin, dichlorohydrin or mixtures thereof in a basic reaction medium. The preparation of polyglycidyl ethers of bisphenol having a 1,2-epoxy equivalency of about 2 and of various molecular weight is well known.

Polyepoxides having an aromatic backbone are preferred because aliphatic materials do not provide as good physical characteristics. A suitable aliphatic polyepoxide is polyether B described in the United States patent to F. E. Condo et al., No. 2,752,269. A commercially available similar product is Epon 562 (Shell Chemical Company).

Particulary preferred polyglycidyl ethers of bisphenol A in accordance with the present invention and having a 1,2epoxy equivalency in excess of 1.4 and preferably about 2 are those having a molecular weight in the range of from about 360 to about 1200. These resins have an epoxy value of about 0.15 to 0.5. The epoxy value may be defined as the number of mols of epoxy groups in 100 grams of polyepoxide resin component. Although epoxide resins falling within the narrow molecular weight range of from 600 to 1200 and having a 1,2epoxy equivalency in excess of 1.4, preferably about 2, are particularly preferred, polyglycidyl ethers of bisphenol A having a 1,2epoxy equivalency greater than 1.0 and a molecular weight in the range of from about 300 to about 1200, may be used to advantage.

A polyepoxide of relatively low molecular weight (350–370) and having an epoxy value of about 0.5–0.54 which may be employed in accordance with the present invention may be prepared in accordance with the instructions set forth in the section designated "Polyether A" in the United States patent to B. C. Shokal et al., No. 2,643,239 dated June 23, 1953. In this manner there are provided liquid polyepoxides of minimum molecular weight using bisphenol A and a large excess of epichlorohydrin. By reducing the molecular excess of epichlorohydrin, products of somewhat higher molecular weight may be obtained.

A further liquid polyepoxide resin which may be used in the reaction product of bisphenol A and epichlorohydrin having a molecular weight of 390 and an epoxy value of 0.54. A commercially available material of this type is Epon 828 (Shell Chemical Company). By reducing the mol ratio of epichlorohydrin to bisphenol A to a value of less than 2:1, still higher molecular weight products may be achieved. A polyepoxide having a molecular weight of 630 and an epoxy value of 0.26 and produced by reaction of bisphenol A and epichlorohydrin may also be employed. A commercially available material of this type is Epon 864 (Shell Chemical Company). Epon 834 (Shell Chemical Company) having a molecular weight of about 530 and an epoxy value of 0.38 and Epon 1001 (Shell Chemical Company) having a molecular weight of about 1000 and an epoxy value of 0.20 are also well adapted to use in the invention. The molecular weights referred to above will be understood to refer to average molecular weight.

Other commercially available epoxy resins which may be employed are Araldite 6010, Bakelite ERL 2774, and Epi-Rez 504 and 510 (Jones-Dabney).

Other types of polyepoxides may be employed, although the use of polyglycidyl ethers of bisphenol are outstanding with respect to adhesion after contact with liquid water at elevated temperature. Thus, a copolymer of ethyl methacrylate, glycidyl methacrylate and acrylonitrile in weight proportions of 74—10—15 prepared by solvent solution polymerization at a temperature of about 80–100° C. in the presence of a free-radical polymerization catalyst such as an organic peroxide (benzoyl peroxide, for example) may be used. Desirable results can also be achieved using polyepoxides such as EP–201 (Carbide & Carbon) which contains about 92% by weight of

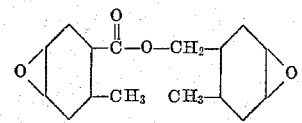

in which the 1,2 epoxy groups are cyclohexyl epoxy groups. The remaining 8% is a mixture of products similar to that pictured above and in which oxidation has proceeded excessively or in which only a single cyclohexyl epoxy group is formed as a result of insufficient epoxidation.

Basic curing catalysts suitable for use in converting the copolymer-epoxy blends of the invention to the thermoset state include alkaline reacting substances, alkaline reacting salts and basic nitrogen compounds. Illustrative basic curing catalysts include amino compounds such as dimethyl amine, trimethyl amine, triethyl amine, ethylene diamine, diethyl amine, diethylene triamine, triethylene tetramine, dimethyl amino methyl phenol, pyridine, piperidine, N,N-diethyl-1,3-propanediamine, dicyandiamide and its formaldehyde condensation products, fatty acid salts of amines, quarternary salts of amines, triethanol amine, guanidine, guanidine salts, etc.

The basic curing catalysts are preferably used in small amounts of from about 0.1% to about 4% based on the total weight of copolymer and polyepoxide. As little as 0.675% of dimethylaminomethyl phenol, or 0.45% of triethylamine or 0.26% of trimethylamine is effective to catalyze the reaction. More than 4% of basic curing catalyst may be used but it is preferred to employ the smallest effective amount to avoid detrimentally affecting film properties.

The present invention includes the modification of the copolymer-containing coating solution by the inclusion in the solution of "B" stage phenolic resins together with the polyepoxide component.

The phenolic resins enhance the water and solvent resistance of the finished thermoset coatings without significantly altering the other desirable can coating characteristics which are achieved by the invention. Thus, as much as 40 parts of "B" stage phenolic resin may be incorporated per 100 parts of the final resinous product without substantially reducing the flexibility, toughness, adherence, insolubility and inertness of the coating. This is surprising when it is noted that the phenolic material incorporated is soluble, rigid and brittle. At least 5 parts of "B" stage phenolic resin per 100 parts of the final resinous product should be incorporated to provide significant enhancement in the resistance of the coating to water, either in the liquid or vapor phase. Preferably, the ratio of the polyepoxide to the phenolic resin, by weight, is from 1:2 to 2:1.

The phenolic resins which can be incorporated in the copolymer-polyepoxide blends of the invention are organic solvent soluble and fusible, alkaline condensed, "B" stage phenol formaldehyde resins. These resins are condensed using alkaline catalysts such as sodium hydroxide, zinc oxide, ammonia, benzylamine, morpholine and other amines such as hydroxy amines, e.g., triethanolamine and alkylene polyamines, e.g., diethylene triamine. About 1.0% by weight of catalyst based on the weight of the phenol is suitable. Ammonia is the preferred catalyst.

The phenolic constituent of the aforesaid phenol formaldehyde resins contains only a single hydroxy group in each phenolic nucleus which is present in the phenolic constituent. Suitable phenolic constituents include phenol itself, ortho, meta or para cresols as well as mixtures thereof, the various xylenols, bisphenol A (p,p'-dihydroxy diphenyl 2,2'propane) and also substituted phenols such as p-phenylphenol, p-cyclohexylphenol, p-tert-butylphenol and p-tert-amyl-phenol. The mol ratio of phenol to formaldehyde in the phenolic resins is from 1.0:0.8 to 1.0:1.5 to provide a heat-reactive resin.

The resins of the present invention can be used as primers as well as for finish coating the can. That is to say, the resins selected in accordance with this invention can all satisfy, to at least some substantial degree, the many rigorous requirements for a satisfactory can coating noted hereinbefore and in addition are sufficiently abrasion resistant and insoluble to constitute a desirable surface layer. Additionally, all of the resins selected in accordance with the invention provide surfaces which are adherent and to which other resins can be firmly secured. Thus, the resins selected by the invention can be used as a base to which to adhere other and more effective coatings which may be solderable in accordance with the invention, or not solderable, e.g., prior art can coating compositions.

The following examples and tables will serve to illustrate our invention, it being understood that we are not limited to the specific compositions and ingredients therein recited and that pigments, dyes, modifying resins, waxes and the like may be added to the compositions of the invention for decorative purposes and the like without otherwise materially affecting the significant characteristics of the compositions.

EXAMPLE I

A mixture of 5 grams of glacial acrylic acid, 30 grams of distilled acrylonitrile, 65 grams of distilled ethyl acrylate, 100 grams of methyl ethyl ketone and one gram of benzoyl peroxide was refluxed at 80° C. for 4 hours. An 80% yield of copolyer was obtained. The resulting copolymer solution had a #4 Ford Cup viscosity of 21 seconds at 80° F. at 18% total solids in methyl ethyl ketone. Films of this resin were applied to strips of 0.25/85# electrolytic tinplate at 5 mg./sq. in. and baked 10 minutes at 400° F. The coated strips were dipped in molten solder at 700° F. and the ability of the solder to wet and flux the tin noted. The results were excellent.

EXAMPLE II

A mixture of 35 grams of distilled ethyl acrylate, 55 grams of 2 ethyl hexyl acrylate, 5 grams of glacial acrylic acid, 30 grams of distilled acrylonitrile, 125 grams of methyl ethyl ketone and 2.50 grams of benzoyl peroxide was refluxed at 80° C. for 24 hours. A 96.6% conversion to copolymer was obtained. The resulting resin solution was reduced to 24% solids by thinning with methyl ethyl ketone and found to have a #4 Ford Cup viscosity of 17 seconds at 80° F.

Films of this resin were deposited upon strips of 0.25/85# electrolytic tinplate at 5 mg./sq. in and baked 10 minutes at 400° F. The coated strips were dipped in molten solder at 700° F. and the ability of the solder to wet and flux the tin noted. The results were excellent.

EXAMPLE III

A mixture of 32 grams of distilled ethyl acrylate, 2.6 grams of glacial acrylic acid, 15.0 grams of distilled acrylonitrile, 1.0 gram of benzoyl peroxide, 17 grams of dimethyl formamide and 32 grams of xylol was refluxed for 8 hours at 80° C. At the end of this period a 46.42% solids solution was obtained representing 92.8% conversion of monomer to copolymer. This solution was reduced to 42.9% solids using a solvent mixture of 52% xylol and 48% Cellosolve acetate. The resulting solution (I) had a Brookfield viscosity at 80° F. of about 15,000 cps.

53.4 parts by weight of solution I were mixed with 46.6 parts by weight of Cellosolve acetate. The resulting solution II was characterized by a viscosity of 90 sec. #4 Ford Cup at 80° F. and a weight per gallon of 8.24 lb. at 77° F. The entire surface area of can body blanks of 0.5#/85# electrolytic tinplate was coated with solution II at 4 mg./sq. in. and the coating baked 10 minutes at 400° F. to dry the film. The coated body blanks were then fabricated into can bodies and the side seams of cans so prepared were tested for strength by subjecting the can to an internal pressure of 90 pounds per square inch and determining the time required for the seam to burst. Excellent results were obtained, with the cans so prepared actually showing greater side seam strength than uncoated cans as evidenced by the fact that cans so prepared require 125 sec. for the seam to burst under pressure of 90 pounds per square inch whereas cans prepared from plate containing a "solder margin," that is to say, no coating at the soldered area, burst after only 30 seconds under these conditions.

EXAMPLE IV

A mixture of 92 grams of butyl methacrylate, 5 grams of glacial acrylic acid, 5 grams of acrylonitrile, 1 gram of benzoyl peroxide and 102 grams of xylene were refluxed at 80° C. for 6 hours. A 95% conversion to copolymer was obtained. A solution was then prepared from 100 parts of the copolymer, 8 parts of Epon 828 (Shell Chemical Company) and 2 parts of an amine (e.g., piperidine) and thinned with 85/15 blend of xylene/isophorone to a resin solids content of approximately 37%.

Films of this resin mixture were deposited upon strips of 0.25/85# electrolytic tinplate at 5 mg./sq. in. and baked 10 minutes at 300° F. The coated strips were dipped in molten solder at 700° F. and the ability of the solder to wet and flux the tin noted. The results were excellent.

EXAMPLE V 54.5 parts by weight of solution I from Example III, 2.75 parts by weight of a phenol/p-phenyl-phenol-formaldehyde resin, 1.35 parts by weight of Epon 864 (Shell Chemical Company) and 41 parts by weight of Cellosolve acetate were blended. The resulting solution had a viscosity of about 100 seconds #4 Ford Cup at 80° F., a weight per gallon of 8.30 pounds at 77° F. and a solids content of 27%.

Films of this resin mixture were deposited on strips of 0.25#/85# electrolytic tinplate at 5 mg./sq. in. and baked 10 minutes at 400° F. The coated strips were dipped in molten solder at 700° F. and the ability of the solder to wet and flux the tin noted. Thee results were excellent.

For the purpose of illustrating the copolymer compositions which may be used in accordance with the invention as well as the proportions of the components thereof, there is presented in Table I below illustrative specific solderable can coatings. The proportions of each component is presented in parenthesis in parts by weight immediately following the listing of the monomer component.

*Table I*

(1) Ethyl acrylate (65); glacial acrylic acid (5); acrylonitrile (30)
(2) Ethyl acrylate (65); glacial acrylic acid (5); acrylonitrile (6)
(3) Ethyl acrylate (75); glacial acrylic acid (12.5); acrylonitrile (12.5)
(4) Methyl acrylate (65); glacial acrylic acid (5); acrylonitrile (30)
(5) Methyl acrylate (56); glacial acrylic acid (5); acrylonitrile (30)
(6) Butyl acrylate (65); glacial acrylic acid (5); acrylonitrile (30)
(7) Butyl acrylate (83); glacial acrylic acid (5); acrylonitrile (30)
(8) Isobutyl acrylate (65); glacial acrylic acid (5); acrylonitrile (30)
(9) Isobutyl acrylate (83); glacial acrylic acid (5); acrylonitrile (30)
(10) Ethyl butyl acrylate (65); glacial acrylic acid (5); acrylonitrile (30)
(11) Ethyl butyl acrylate (101); glacial acrylic acid (5); acrylonitrile (30)
(12) Iso-octyl acrylate (120); glacial acrylic acid (5); acrylonitrile (30)
(13) Iso-octyl acrylate (65); glacial acrylic acid (5); acrylonitrile (30)
(14) Iso-decyl acrylate (103); glacial acrylic acid (5); acrylonitrile (30)
(15) Tri-decyl acrylate (65); glacial acrylic acid (5); acrylonitrile (30)
(16) Tri-decyl acrylate (165); glacial acrylic acid (5); acrylonitrile (30)
(17) Ethyl acrylate (35); ethyl hexyl acrylate (55); glacial acrylic acid (5); acrylonitrile (30)
(18) Ethyl acrylate (97); glacial acrylic acid (3)
(19) Butyl methacrylate (93); glacial acrylic acid (7)
(20) Ethyl acrylate (22); butyl methacrylate (66); glacial acrylic acid (12)
(21) Hexyl methacrylate (92); glacial acrylic acid (5)
(22) Ethyl hexyl acrylate (64); butyl methacrylate (43); glacial acrylic acid (5); acrylonitrile (30)
(23) Ethyl hexyl acrylate (64); ethyl methacrylate (34); glacial acrylic acid (5); acrylonitrile (30)
(24) Decyl methacrylate (95); glacial acrylic acid (5)
(25) Ethyl methacrylate (74); glacial methacrylic acid (6) acrylonitrile (15); allyl glycidyl ether (5)
(26) Ethyl methacrylate (74); glacial acrylic acid (5); acrylonitrile (15); allyl glycidyl ether (5)
(27) Ethyl hexylacrylate (28); glacial acrylic acid (5); acrylonitrile (75)
(28) Isodecyl methacrylate (65); isooctyl methacrylate (35); glacial acrylic acid (6)
(29) Lauryl methacrylate (92); glacial acrylic acid (5)
(30) Stearyl methacrylate (92); glacial acrylic acid (5)

In each instance in the above Table I, the resins were deposited upon electrolytic tin plate at a coating weight of 5 milligrams per square inch and baked at 400° F. for ten minutes. The tin plate was coated to its edges and the coated tin plate was formed into a can body with a folded seam and soldered at the seam. Both 50/50 and 98/2 lead/tin solders were used with a soldering temperature of 700° F. obtaining during solder application. The soldered joints which were produced were uniformly acceptable. The presence of the coatings within the folded joint and in the areas immediately surrounding the same did not interfere with the soldering operation in general, the soldered joints were considerably stronger than the same soldered joint in the absence of the coating, strength of the joint being determined by the pressure resistance procedure previously described.

Each of the resins listed in Table I above were then modified to include 5 parts of Epon 864 per 100 parts of resin solids. Again, the presence of the coating did not interfere with the soldering of the side seam and the solder bonded strongly to the metal despite the initial presence of the coating in the seam area.

Each of the resins listed in Table I above were then modified to include 10 parts of a "B" stage phenol formaldehyde resin per 100 parts of resin solids. The modified resins did not prevent a secure bond from being achieved between the solder and the metal of the can body.

Each of the resins listed in Table I were then modified to include 5 parts of Epon 864 and 10 parts of "B"

stage phenol-formaldehyde resin per 100 parts of resin solids. Again, the presence of the coating did not interfere with the soldering of the side seam and the solder bonded strongly to the metal.

The "B" stage phenol-formaldehyde resin referred to above was produced by condensing formaldehyde with a 50:50 weight ratio mixture of phenol and p-phenyl phenol. The condensation was effected employing a mol ratio of phenol component to formaldehyde of 1.0, the reaction being effected in the presence of 1% by weight of ammonia as catalyst.

A tabular comparison showing sanitary can coating characteristics and solderability for conventional commercial sanitary can coating resins and the copolymer and copolymer blends of the invention is set forth in Table II which follows:

*Table II*

[Comparison of Commercial Can Primers With Coatings of the Invention.]

| Primer Type | Property | | | | |
|---|---|---|---|---|---|
| | Fabrication | Process Resistance | Adhesion | Topcoat Adhesion | Solderability [1] |
| Oleoresinous | Good | Good | Good | Good | Poor. |
| Epoxy/U.F. | do | do | do | do | Do. |
| Epoxy/Phenolic | do | do | do | do | Do. |
| Phenolic | Fair | do | do | do | Do. |
| Acrylate Copolymers | Good | do | do | do | Good. |
| Acrylate Copolymers Modified with Epoxy and Phenolic. | do | do | do | do | Do. |

[1] Good indicates the coating does not interfere with the production o a secure soldered seam and that the coating retains its continuity immediately adjacent the solder.

As can be seen, the invention uniquely couples good properties required in sanitary can coatings with good solderability.

The invention is illustrated in the accompanying drawings in which:

FIG. 1 is a perspective view of a can body showing the side margins of a can body blank folded together and secured at the folded portion with solder and with the can body being provided with a protective resinous coating which abuts the side margin of the solder;

FIG. 2 is a cross-section through a folded seam prior to soldering and illustrating a preliminary step in the procedure of the invention;

FIG. 3 is a cross-section showing the folded seam of FIG. 2 after soldering;

FIG. 4 is a cross-section similar to FIG. 3 and illustrating the invention as applied to can body stock which has been protectively coated on both faces thereof with the folded seam being soldered on both sides to provide a seam of maximum strength; and FIG. 5 is a graphical triangulation of ester-acid-nitrile copolymers which may be employed in accordance with the invention.

Referring more particularly to the drawings, numeral 10 generically identifies a can body which is produced by forming a can body blank which is a sheet of metal, most commonly blackplate or tinplate, dimensioned and shaped to provide after rolling and folding of the side marginal portions, a generally cylindrical tube from which a can may be produced. The can body 10 is constituted by a rolled sheet of metal 11, the side margins of which have been folded together to form a seam indicated at 12. The interior of the can body of FIG. 1 is provided with a baked resinous coating 13, it being understood that the exterior of the can body 10 may be similarly coated. The seam 12 has been soldered as indicated at 14 to improve the strength of the seam and enable the same to resist pressure, most commonly arising from within the completed can.

As will be seen in FIG. 1, the side margins of the solder are abutted by the coating 13 along the length of the folded seam 12.

In the procedure of the invention, there is first provided a can body blank having at least one face entirely coated with a copolymer coating in accordance with the invention. This coated blank is then formed into a can body by folding together the side margins thereof. The folded together portion of the product prior to soldering is illustrated in the enlarged and diagrammatic cross-section of FIG. 2 in which it will be seen that the coating 13 extends into the folded portion 12. As will be appreciated, presently known can coating compositions which are sufficiently effective as protective coatings to be satisfactory for sanitary can purposes, if they extended into the folded seam 12 would prevent the achievement of a satisfactory soldered joint in the area of the seam.

In FIG. 3, the seam 12 has been soldered as shown at 14 and the side margins of the solder are abutted by the coating 13 as indicated at 15. It will be understood that the abutment 15 is diagrammatically pictured for in some instances the coating 13 is melted away by the heat of the solder and in other instances a portion of the coating 13 is undercut by the solder. In either event, wherever the solder terminates, the side margin thereof is abutted by the coating 13.

As indicated in FIG. 4, the sheet of metal 11 may be coated on both of its faces and the solder may be applied from both sides. Thus, there may be provided the coating 13' in addition to the coating 13 and the solder seam 14' in addition to the solder seam 14.

The outstanding utility of the invention, as has been emphasized hereinbefore, is directed to the provision of a sanitary can. However, the superior coatings set forth in the present application are also applicable to the protective coating of appliances where the same requirement of flexibility, adhesion, fabrication, and resistance to corrosion are also important. The problem of providing protective finishes for sheet metal used in appliances is also a serious one since it is frequently desired to apply the protective coating prior to fabrication and the formation of folded seams which are to be soldered for the purpose of increasing the strength thereof. Accordingly, though the present invention is particularly directed to the provision of sanitary cans where the requirements for a successful coating are extremely high, the invention is not limited to sanitary cans but extends to include the provision of protective coatings on sheet metal used in appliances where the requirements of a satisfactory coating are presently somewhat lower than are insisted upon in the sanitary can field.

The invention is defined in the claims which follow.

We claim:

1. A soldered seam comprising two portions of sheet metal folded together and soldered at the folded portion thereof with said solder being securely bonded directly to said sheet metal, said portions of sheet metal having a baked protective resinous coating adhered to at least one face thereof with said coating abutting the side margins of said solder along the length of said folded portion, said coating comprising a copolymer of monomer components consisting essentially of (A) alpha-beta, mono-ethylenically unsaturated aliphatic carboxylic acid selected from the group consisting of acrylic acid and methacrylic acid, (B) an alkyl ester of an acid selected from the group consisting of acrylic acid, methacrylic acid, and mixtures thereof, and (C) acrylonitrile, the mol proportion of said monomer components being within the closed area A—B—C—D—E—A of the accompanying graph and said copolymer having a relative viscosity measured at 25° C. in a 1 gram per 100 milliliter solvent solution in dimethyl formamide of between about 1.25 and 5.0.

2. A soldered seam as recited in claim 1 in which said coating includes a polyepoxide having a 1,2 epoxy equivalency greater than 1.0, a molecular weight of from 300–

1200 and a boiling point at normal atmospheric pressure in excess of 300° C., said polyepoxide being present in an amount of at least 0.2 mol of oxirane per mol of carboxyl in said polymer and having a 1,2 epoxy equivalency in excess of substantially 1.4.

3. A soldered seam as recited in claim 2 in which said polyepoxide is a polyglycidyl ether of a dihydric phenol.

4. A soldered seam as recited in claim 3 in which said dihydric phenol is a bisphenol.

5. A soldered seam as recited in claim 2 in which said coating includes from 5–40 parts per 100 parts of said coating of a thermoset phenol formaldehyde resin containing phenol and formaldehyde in a mol ratio of between approximately 1.0:0.8 and 1.0:1.5.

6. A soldered seam as recited in claim 5 in which said polyepoxide and said phenol-formaldehyde resin are present in a weight ratio of from 1:2 to 2:1.

7. A soldered seam as recited in claim 1 in which the mol proportion of said monomer components is within the closed area G—B—C—D—F—G of the accompanying graph.

8. A can body comprising a rolled sheet of metal having the side margins thereof folded together with said folded together portions being soldered to secure the same with said solder being securely bonded directly to said sheet metal, said sheet of metal having a baked protective resinous coating adhered to at least one face thereof with said coating abutting the side margins of said solder along the length of said folded portion, said coating comprising a copolymer of monomer components consisting essentially of (A) alpha-beta, mono-ethylenically unsaturated aliphatic carboxylic acid selected from the group consisting of acrylic acid and methacrylic acid, (B) an alkyl ester of an acid selected from the group consisting of acrylic acid, methacrylic acid, and mixtures thereof, and (C) acrylonitrile, the mol proportion of said monomer components being within the closed area A—B—C—D—E—A of the accompanying graph and said copolymer having a relative viscosity measured at 25° C. in a 1 gram per 100 milliliter solvent solution in dimethyl formamide of between about 1.25 and 5.0.

References Cited in the file of this patent

UNITED STATES PATENTS

| | | |
|---|---|---|
| 2,062,234 | Robison | Nov. 24, 1936 |
| 2,233,549 | O'Neil | Mar. 4, 1941 |
| 2,386,813 | O'Brien et al. | Oct. 16, 1945 |
| 2,541,011 | Caldwell | Feb. 13, 1951 |
| 2,557,266 | Dittmar | June 19, 1951 |
| 2,583,325 | D'Aledlio | Jan. 22, 1952 |
| 2,604,464 | Segall | July 22, 1952 |
| 2,607,711 | Hendricks | Aug. 19, 1952 |
| 2,784,128 | Schroeder | Mar. 5, 1957 |
| 2,787,561 | Sanders | Apr. 2, 1957 |
| 2,787,603 | Sanders | Apr. 2, 1957 |
| 2,790,735 | McLaughlin et al. | Apr. 30, 1957 |
| 2,819,237 | Daniel | Jan. 7, 1958 |
| 2,842,285 | Sackett | July 8, 1958 |